(12) United States Patent
Gitt

(10) Patent No.: US 7,409,886 B2
(45) Date of Patent: Aug. 12, 2008

(54) TWIN CLUTCH TRANSMISSION WITH COAXIAL DRIVE AND OUTPUT

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 159 days.

(21) Appl. No.: 10/566,890

(22) PCT Filed: Jul. 24, 2004

(86) PCT No.: PCT/EP2004/008324

§ 371 (c)(1),
(2), (4) Date: Mar. 16, 2006

(87) PCT Pub. No.: WO2005/012762

PCT Pub. Date: Feb. 10, 2005

(65) Prior Publication Data

US 2006/0219033 A1    Oct. 5, 2006

(30) Foreign Application Priority Data

Aug. 1, 2003 (DE) ................. 103 35 262

(51) Int. Cl.
*F16H 3/22* (2006.01)
(52) U.S. Cl. .............. 74/342; 74/329; 74/330; 74/331; 74/340
(58) Field of Classification Search ............ None
See application file for complete search history.

(56) References Cited

U.S. PATENT DOCUMENTS 2,612,787 A * 10/1952 Youngren et al. ............ 74/330
2,658,405 A    11/1953 Dodge
4,463,621 A    8/1984 Fisher
4,463,821 A    8/1984 Falamak
5,367,914 A    11/1994 Ordo
6,595,077 B1   7/2003 Geiberger et al.
7,140,267 B2 * 11/2006 Haka ............................ 74/331
2003/0111285 A1 6/2003 Gansloser et al.

FOREIGN PATENT DOCUMENTS

| CH | 251 271 | 10/1947 |
|---|---|---|
| DE | 31 31 139 A | 2/1983 |
| DE | 31 31 156 A1 | 2/1983 |
| DE | 199 39 334 A1 | 3/2001 |
| DE | 100 60 699 A1 | 6/2001 |
| DE | 101 02 028 A | 8/2001 |
| DE | 101 03 664 A1 | 8/2002 |
| DE | 103 25 647 A1 | 2/2004 |
| EP | 0 278 938 A | 8/1988 |
| EP | 0 354 890 A | 2/1990 |
| EP | 1 141 580 B1 | 10/2001 |
| EP | 1 321 327 A2 | 6/2003 |
| GB | 2103316 A * | 2/1983 |
| GB | 2 199 624 A | 7/1988 |
| JP | 02-146336 A | 6/1990 |

* cited by examiner

*Primary Examiner*—David D. Le
(74) *Attorney, Agent, or Firm*—Collard & Roe, P.C.

(57) ABSTRACT

The invention relates to a twin clutch transmission of high efficiency which is compact in every dimension. This twin clutch transmission can be used particularly in vehicles having a longitudinally installed engine. For this purpose, the transmission input shaft and the transmission output shaft are arranged coaxially with respect to one another, whereas the two countershafts are arranged parallel to one another. Furthermore, the shift sleeves are arranged in a special way, thus making seven forward gears and a plurality of reverse gears possible.

12 Claims, 3 Drawing Sheets

| | K1 | K2 | S1 | N | S2 | S3 | N | S4 | S5 | N | S6 | S7 | N | S8 |
|---|---|---|---|---|---|---|---|---|---|---|---|---|---|---|
| R3 | | ● | | ● | | ● | | | | | ● | | ● | |
| R2 | | ● | | ● | | | ● | | | | ● | | | ● |
| R1 | ● | | | | ● | | ● | | | | ● | | ● | |
| G1 | ● | | | ● | | | ● | | | ● | | | | ● |
| G2 | | ● | | | ● | | ● | | | | ● | | ● | |
| G3 | ● | | | ● | | ● | | | | ● | | | ● | |
| G4 | | ● | | ● | | | ● | | ● | | | | ● | |
| G5 | ● | | | ● | | | ● | | | ● | | ● | | |
| G6 | | ● | ● | | | | ● | | | ● | | | ● | |
| G7 | ● | | | ● | | | | ● | | ● | | | ● | |

| | K1 | K2 | S1 | N | S2 | S3 | N | S4 | S5 | N | S6 | S7 | N | S8 |
|---|---|---|---|---|---|---|---|---|---|---|---|---|---|---|
| R2 | | ● | | | | ● | | | | | ● | | | |
| R1 | ● | | | | | | | | | | ● | | | ● |
| G1 | ● | | | | | | | | | | | | | ● |
| G2 | | ● | | | ● | | | | | | | | | |
| G3 | ● | | | | | ● | | | | | | | | |
| G4 | | ● | | | | | | | ● | | | | | |
| G5 | ● | | ● | | | | | | | | | | | |
| G6 | | ● | | | | | | | | | | ● | | |
| G7 | ● | | | | | | | ● | | | | | | |

TWIN CLUTCH TRANSMISSION WITH COAXIAL DRIVE AND OUTPUT

CROSS REFERENCE TO RELATED APPLICATIONS

Applicant claims priority under 35 U.S.C. §119 of German Application No. 103 35 262.7 filed Aug. 1, 2003. Applicant also claims priority under 35 U.S.C. §365 of PCT/EP2004/008324 filed Jul. 24, 2004. The international application under PCT article 21(2) was not published in English.

TECHNICAL FIELD

The invention relates to a twin clutch transmission according to the preamble of patent claim 1.

BACKGROUND ART

DE 101 02 028 A1 already discloses a twin clutch transmission, in which the transmission input shaft and the transmission output shaft are arranged coaxially with respect to one another. The countershafts assigned to the two partial transmissions are arranged parallel to one another.

Furthermore, DE 31 31 156 A1 discloses twin clutch transmissions in which a transmission input shaft and a transmission output shaft are arranged coaxially with respect to one another. The twin clutch transmission has a plurality of reverse gears in addition to six forward gears.

DE 103 25 647.4, not yet published, shows a twin clutch transmission, in which, in accordance with the invention:
- a transmission input shaft and a transmission output shaft are arranged coaxially with respect to one another,
- two countershafts are arranged so as to be offset in parallel with respect to one another and to the transmission input shaft and transmission output shaft,
- a direct gear is provided,
- otherwise, all the even-numbered forward gears are assigned solely to one countershaft and all the odd-numbered forward gears are assigned solely to the other countershaft,
- there being arranged coaxially on the transmission output shaft, offset axially with respect to a shift sleeve assigned to the direct gear and a further forward gear, a further shift sleeve assigned to two forward gears,
- there lying, offset axially with respect to said two shift sleeves, a shift sleeve plane, in which are arranged two further shift sleeves, each of which is assigned in each case to one of the two countershafts.

In contrast to the invention, in this twin clutch transmission, a forward gear runs via four gear ratio stages.

DISCLOSURE OF INVENTION

The object of the invention is to provide a twin clutch transmission, compact in every dimension, for a vehicle with an engine installed longitudinally in the direction of travel, said twin clutch transmission having high efficiency.

Twin clutch transmissions with a coaxial input shaft and transmission output shaft may be used in an especially advantageous way in connection with a longitudinally installed engine. Drivetrains with a longitudinally installed engine have the advantage that these can be installed in vehicles with high torques. The transmission is mostly followed by a cardan shaft which transfers the drive torque to a rear axle via a rear axle transmission. In commercial vehicles and passenger cars with four-wheel drive, the drive torque is optionally transferred from the composite longitudinal engine/transmission structure to at least one further vehicle axle via a power divider. The twin clutch transmission according to the invention is consequently employed primarily in passenger cars of the luxury class and in commercial vehicles.

The coaxial type of construction of the transmission input shaft and transmission output shaft makes it possible in an especially advantageous way, depending on the customer's wishes, to equip the vehicles alternatively with the twin clutch transmission according to the invention or with an epicyclic automatic transmission, the input and output shafts of which lie coaxially as a consequence of the principle involved. Consequently, in an especially advantageous way, the diversity of parts in the vehicle variants can be kept low.

A further advantage of the invention arises from the arrangement of the two countershafts which is offset in parallel and which makes it possible to have an axially shorter type of construction of the transmission than the coaxial type of construction of the two countershafts, as is shown, for example, in EP 1 141 580 A1. Thus, in spite of the additional clutch, the twin clutch transmission according to the invention has as axial build no longer than a manual shift transmission with only one starting and shift clutch. It is even possible to build the twin clutch transmission, which has the advantage of power shiftability, as compared with the manual shift transmission, so that it is just as short as or even shorter than a manual shift transmission with the same number of forward gears and nevertheless to provide additional reverse gears, this being advantageous particularly in the case of commercial vehicles. Furthermore, there is a possibility, when fundamentally the same basic transmission is used, depending on the customer's wishes, optionally to equip some twin clutch transmissions with one reverse gear and the rest of the twin clutch transmissions with a plurality of reverse gears. This modular system affords cost benefits. Particularly in comparison with twin clutch transmissions having countershafts which are offset in parallel and are arranged coaxially with respect to the respective clutch, as shown, for example, in DE 199 39 334 A1 or in DE 101 02 028 A1, FIG. 12, the invention affords the advantage of a narrow type of construction of the transmission. Consequently, in contrast to the twin clutch transmission according to DE 199 39 334 A1, the twin clutch transmission according to invention can be employed in an especially advantageous way in vehicles with narrow vehicle tunnels or with low ground clearance.

As compared with other twin clutch transmissions of relatively compact build with a coaxial transmission input and transmission output, such as is shown, for example, in DE 101 02 028 A1, FIG. 1, the twin clutch transmission according to the invention has a direct gear. This may be of a load-shiftable type in an especially advantageous way. Since toothing engagements for torque transfer are dispensed with, the direct gear has especially high efficiency. In the twin clutch transmission according to the invention, the efficiency is even higher, since the force flux of the remaining forward gears runs only via two toothing pairings.

In an especially advantageous way, at least one reverse gear can run via both countershafts. Construction space can thus be saved. A plurality of reverse gears can be implemented at only low to no additional outlay in terms of construction space.

The arrangement according to the invention of the shift sleeves makes it possible in an especially advantageous way, in the case of an optimal utilization of four shift sleeves, to have seven forward gears and at least two reverse gears. Furthermore, the offset arrangement, stated in patent claim 1, of the four shift sleeves further allows a compact construction of the twin clutch transmission both in the axial direction and transversely thereto.

The twin clutch transmission according to the invention may in an especially advantageous way be staged progressively or at least approximately progressively.

In an especially advantageous way, all the forward gears may be of the sequentially power-shiftable type. Depending on the design of the wheel set, the changeover between the first forward gear and the first reverse gear may take place solely by the alternate closing of the two clutches of the twin clutch transmission, without a shift sleeve having to be actuated in this case. This is especially favorable with regard to short transition times from the reverse gear into the first forward gear, which are advantageous not only for maneuvering, but also, for example, for a "rocking" of the stuck vehicle. During the "rocking cycle", the vehicle is driven briefly forward and backward, in order by momentum to escape, for example, from a sandpit. The inertia of the vehicle mass and load mass is consequently utilized in order to assist possibly poorly gripping drive of the driving wheels. In this respect, a twin clutch transmission proves to be especially advantageous, since it can be designed to be fully automatic. Even a fully automatic "rocking mode" can consequently be provided. In addition, as well as the fully automatic operating mode, the semiautomatic operating mode may also be provided, in which the gear change is predetermined directly by the vehicle driver. This gear change is executed automatically when corresponding boundary conditions are fulfilled. These boundary conditions are, for example, adherence to the maximum and the minimum permissible engine rotational speed,
a vehicle stability program, such as, for example, an electronic stability program ESP or an antilock system ABS or a traction control ASR, is inactive.

In an especially advantageous way, in each case, at least one gearwheel may be doubly occupied. That is to say, the gearwheel is in the active torque path in at least two gear stages.

A reversing shaft, by means of which the direction of rotation is reversed for reverse gear, may in an especially advantageous way carry a plurality of, in particular two, gearwheels. These gearwheels may be designed, in particular, as fixed wheels.

Further advantage of the invention may be gathered from the further patent claims, the description and the drawing.

BRIEF DESCRIPTION OF DRAWINGS

The invention is illustrated below, with reference to three exemplary embodiments, in the drawing in which.

MODES FOR CARRYING OUT THE INVENTION

Figures 1, 2:
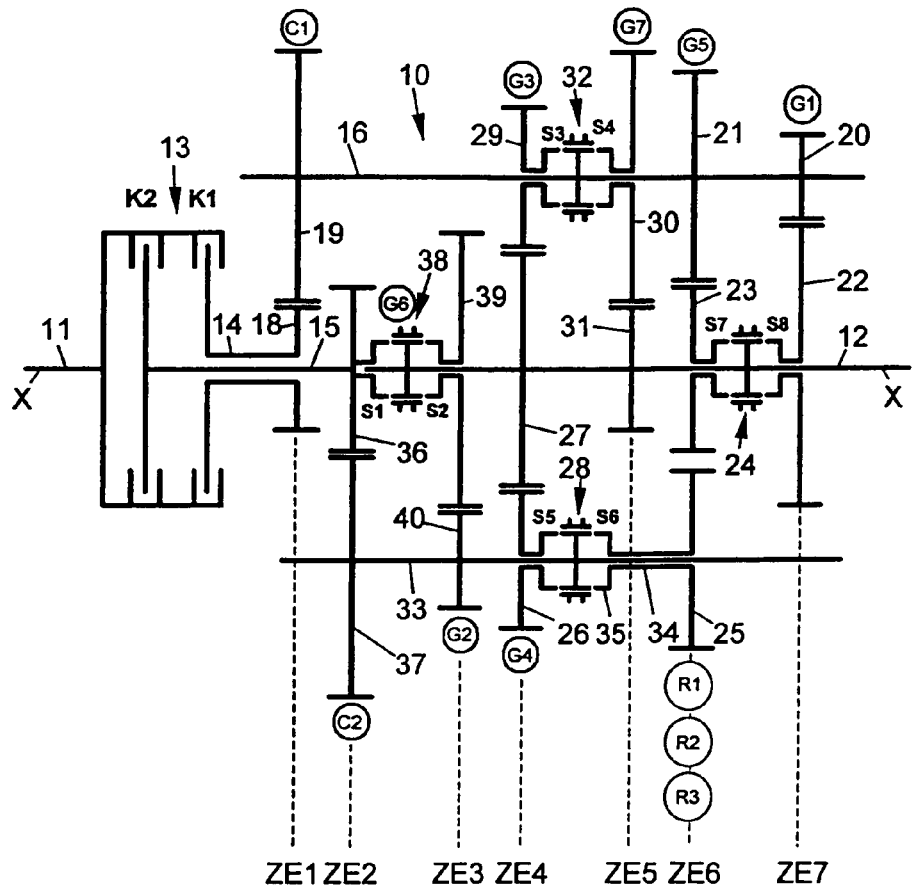
FIG. 1 shows diagrammatically a transmission diagram of a twin clutch transmission in a first embodiment of the invention.
FIG. 2 shows a table of the shift states of the clutches and shift sleeves of the twin clutch transmission according to FIG. 1.

A twin clutch transmission 10 according to the invention, as shown in FIG. 1, is used in a drivetrain of a motor vehicle. In this case, the twin clutch transmission 10 is interposed between an engine and an output shaft, for example a propeller shaft or cardan shaft. This is preferably a standard drivetrain with an engine which is arranged in a front longitudinal mounting, and with a rear drive. The preferred embodiment of the invention also includes a multiaxle drive. This multiaxle drive may be designed with a side shaft led to the front axle, that is known, for example, from EP 1 321 327 A2. Furthermore, the multiaxle drive may be designed with a through-drive axle, as is known from heavy commercial vehicles.

The twin clutch transmission has an input shaft 11,
in particular a crankshaft or
a shaft rotating with the latter or
a two mass flywheel or
a flexible dog plate, and a transmission output shaft 12. The input shaft 11 and transmission output shaft 12 are arranged coaxially with respect to a transmission axis X-X. The input shaft 11 is connected to the engine, if appropriate with at least one further transmission stage interposed. The transmission output shaft 12 is connected to vehicle wheels, if appropriate with at least one further transmission stage interposed.

The expressions:
"front" and "rear",
"first to seventh gearwheel plane" and
"upper countershaft" and "lower countershaft" are used below.

"Front" is in this case the direction pointing forward when the motor vehicle is in forward drive, whereas "rear" is correspondingly the opposite direction. In the drawing, "front" is illustrated on the left and "rear" on the right.

The "first to seventh gearwheel plane" counts in this case from front to rear.

A gearwheel plane is a plane in which at least two intermeshing gearwheels are arranged. In the practical implementation of the transmission diagrams illustrated, it may be, particularly in the situation where three gearwheels intermesh in a gearwheel plane, that the gearwheels are not arranged exactly in one plane for reasons of construction space or of dimensioning. Such a reason would be, for example, different tooth widths on the two countershafts, which are due to different torques to be transferred.

The expression "shift sleeve plane" used in connection with the invention means, here, that at least one shift sleeve is located in one plane. In the practical implementation of the transmission diagrams illustrated, it may be, particularly in the situation where at least two shift sleeves are located in one shift sleeve plane, that the shift sleeves are not arranged exactly in one plane for reasons of construction space. The construction space may be predetermined, for example, by the installation position of a shift actuator assembly for the displacement of the shift sleeves for the purpose of a gear change.

The use of the expressions "upper countershaft" and "lower countershaft" serves merely as a guideline in the drawing and is not to be interpreted as restricting the scope of protection. The arrangement of the three shafts parallel to one another:

input shaft and
two countershafts may in this case take place three-dimensionally in a triangle or else in one plane.

The input shaft 11 is drive-connected to a twin clutch 13, designed here as a structural unit. The twin clutch 13 has a clutch K1 and a clutch K2 which, via suitable devices, not illustrated, and so as to ensure a suitable overlap control, transfer the drive torque of the input shaft 11 to an intermediate shaft 14 for a closed clutch K2 and to an intermediate shaft 15 for a closed clutch K1. The clutch K1 is arranged, in the direction of the transmission axis X-X ("in the axial direction" below), on that side of the clutch K2 which faces away from the engine. The intermediate shaft 14 is designed as a hollow shaft and is penetrated radially on the inside by the intermediate shaft 15. In that end region of the intermediate shaft 14 which faces away from the twin clutch 13, the transfer of the drive torque from the intermediate shaft 14 to a countershaft 16 takes place via a constant C1 which forms an input gear ratio and which has a driving gearwheel 18 connected fixedly in terms of rotation to the intermediate shaft 14 and a driven gearwheel 19 connected fixedly in terms of rotation to the countershaft 16. The driving gearwheel 18 and the driven gearwheel 19 lie in a first gearwheel plane ZE1.

A fixed wheel 20 of a forward gear stage G1 and a fixed wheel 21 of a forward gear stage G5 are connected fixedly in terms of rotation to the countershaft 16. The fixed wheel 20 meshes, in a seventh gearwheel plane ZE7, with a loose wheel 22 which is arranged coaxially on the transmission output shaft 12. The fixed wheel 21 meshes, in a sixth gearwheel plane ZE6, with a loose wheel 23 which is arranged coaxially on the transmission output shaft 12 and axially adjacently in front of the loose wheel 22. Arranged axially between the two loose wheels 22 and 23 is a first shift sleeve 24 which can be pushed axially forward into a position S7, so that it makes a rotationally fixed connection between the loose wheel 23 and the transmission output shaft 12. By contrast, when the first shift sleeve 24 is pushed rearward into a position S8, the shift sleeve 24 makes a rotationally fixed connection between the loose wheel 22 and the transmission output shaft 12.

A loose wheel 25 also lies in the sixth gearwheel plane ZE6, which lies coaxially on the lower countershaft 33 and is assigned to three reverse gears R1, R2 and R3. This loose wheel 25 meshes with the loose wheel 23 via an intermediate wheel, not illustrated in any more detail, which is located in the sixth gearwheel plane ZE6.

A loose wheel 26 assigned to the fourth forward gear G4 lies, axially adjacently in front of the loose wheel 25, in a fourth gearwheel plane ZE4. This loose wheel 26 meshes with fixed wheel 27 which is connected fixedly in terms of rotation to the transmission output shaft 12 in the fourth gearwheel plane ZE4. Arranged axially between the two loose wheels 25 and 26 is a second shift sleeve 28 which can be pushed axially forward into a position S5, so that it makes a rotationally fixed connection between the loose wheel 26 and the countershaft 33. By contrast, when the second shift sleeve 28 is pushed axially rearward into a position S6, the shift sleeve 28 makes a rotationally fixed connection between the loose wheel 25 and the lower countershaft 33.

The fourth forward gear G4 is also arranged in said fourth gearwheel plane ZE4 assigned to the third forward gear G3. In this case, a loose wheel 29 assigned to the third forward gear G3 meshes with the fixed wheel 27 on the transmission output shaft 12. The loose wheel 30 lies axially adjacently behind this loose wheel 29, and is assigned to the seventh forward gear G7 and lies in a fifth gearwheel plane ZE5. This loose wheel 30 meshes with a loose wheel 31 likewise lying in the fifth gearwheel plane ZE5. A third shift sleeve 32 lies axially between the loose wheel 29 and the third forward gear G3 and the loose wheel 30 of the seventh forward gear. The shift sleeve 32 can be pushed forward into a position S3, so that it makes a rotationally fixed connection between the loose wheel 29 and the countershaft 16. By contrast, when the third shift sleeve 32 is pushed axially rearward into a position S4, the shift sleeve 32 makes a rotationally fixed connection between the loose wheel 30 and the countershaft 16.

Since room for the fifth gearwheel plane ZE5 therefore also has to be reserved in the axial construction space between the loose wheel 25 of the three reverse gears R1, R2, R3 and the loose wheel 26 of the fourth forward gear G4, in addition to the second shift sleeve 28, loose wheel 25 has an annular extension 34 for its shift toothing 35.

The second gearwheel plane ZE2 of the second transmission constant C2 lies axially in front of the third gearwheel plane ZE3. This second transmission constant C2 comprises:
a driving gearwheel 36 which is connected fixedly in terms of rotation to the rear end of the intermediate shaft 15, and
a driven gearwheel 37 which is arranged fixedly in terms of rotation at the front end of the countershaft 33.

Axially between the driving gearwheel 36 of the second transmission constant C2 and the loose wheel of the second gear G2 lies the direct gear G6, the gear ratio 1:1 of which lies between the gear ratio of the fifth gear G5 and the gear ratio of the seventh gear G7. The transmission output shaft 12 is mounted rotatably in a central bore of the intermediate shaft 15 at a location in front of the direct gear G6. The transmission output shaft 12 is thus rotatable with respect to the intermediate shaft 15 as long as a shift sleeve 38 of the direct gear G6 is not in a front position S1. In this front position S1, the shift sleeve 38 makes a rotationally fixed connection between the intermediate shaft 15 and the transmission output shaft 12.

In a rear position S2, the shift sleeve 38 makes a rotationally fixed connection between the transmission output shaft 12 and a loose wheel 39 which is mounted coaxially with respect to the transmission output shaft. This loose wheel 39 is arranged in the third gearwheel plane ZE3 and meshes with a fixed wheel 40 which is assigned to the second forward gear G2 and which is connected fixedly in terms of rotation to the countershaft 33.

Thus, in the gearwheel and shift element planes which are oriented transversely ("radially" below) with respect to the transmission axis X-X, are arranged in the following order, one behind the other axially from the front to the rear:
in a first gearwheel plane ZE1, the transmission constant C1 assigned to the first clutch K1 and having the driving gearwheel 18 and driven gearwheel 19,
in a second gearwheel plane ZE2, the second transmission constant C2 assigned to the second clutch K2 and having the driving gearwheel 36 and driven gearwheel 37,
in the first shift sleeve plane, the shift element 38 of the direct gear G6 and of the second forward gear G2,
in the third gearwheel plane ZE3, the gearwheels of the second forward gear G2,
in the fourth gearwheel plane ZE4, the gearwheels of the third forward gear G3 and of the fourth forward gear G4,
in the second shift sleeve plane, the two shift sleeves 28, 32 which are arranged on the countershafts 33, 16 and which are assigned to the forward gears G4, G3, G7 and to the reverse gears R1, R2, R3,
in the fifth gearwheel plane ZE5, the two gearwheels of the seventh forward gear G7, in the sixth gearwheel plane ZE6, the gearwheels of the fifth forward gear G5 and of the three reverse gears R1, R2 and R3, in the third shift sleeve plane, a shift sleeve 24 of the fifth transmission gear G5, the three reverse gears R1, R2 and R3 and the first transmission gear G1, and in the seventh gearwheel plane ZE7, the gearwheels for the seventh gear.

FIG. 2 shows a table of the shift states of the two clutches K1, K2 and four shift elements 38, 32, 28, 24 of the twin clutch transmission 10 according FIG. 1.

In the first forward gear G1, the torque path runs via the engaged first clutch K1. The second clutch K2 is disengaged. The shift sleeve 24 is located in the rear position S8. All the other shift sleeves are located in a neutral position N.

In the second forward gear G2, the torque path runs via the engaged second clutch K2. The first clutch K1 is disengaged. The shift sleeve 38 is located in the rear position S2. All the other shift sleeves are located in a neutral position N.

In the third forward gear G3, the torque path runs via the engaged first clutch K1. The second clutch K2 is disengaged. The shift sleeve 32 is located in the front position S3. All the other shift sleeves are located in a neutral position N.

In the fourth forward gear G4, the torque path runs via the engaged second clutch K2. The first clutch K1 is disengaged. The shift sleeve 28 is located in the front position S5. All the other shift sleeves are located in a neutral position N.

In the fifth forward gear G5, the torque path runs via the engaged first clutch K1. The second clutch K2 is disengaged. The shift sleeve 24 is located in the front position S7. All the other shift sleeves are located in a neutral position N.

In the sixth forward gear G6, the torque path runs via the engaged second clutch K2. The first clutch K1 is disengaged. The shift sleeve 38 is located in the front position S1. All the other shift sleeves are located in a neutral position N.

In the seventh forward gear G7, the torque path runs via the engaged first clutch K1. The second clutch K2 is disengaged. The shift sleeve 32 is located in the rear position S4. All the other shift sleeves are located in a neutral position N.

In the first reverse gear R1, the torque path runs via the engaged first clutch K1. The second clutch K2 is disengaged. The shift sleeve 38 is located in the rear position S2. The shift sleeve 28 is located in the rear position S6. The other two shift sleeves are located in a neutral position N.

In the second reverse gear R2, the torque path runs via the engaged second clutch K2. The first clutch K1 is disengaged. The shift sleeve 24 is located in the rear position S8. The shift sleeve 28 is located in the rear position S6. The other two shift sleeves are located in a neutral position N.

In the third reverse gear R3, the torque path runs via the engaged second clutch K2. The first clutch K1 is disengaged. The shift sleeve 32 is located in the front position S3. The shift sleeve 28 is located in the rear position S6. The other two shift sleeves are located in a neutral position N.

Thus, in this transmission diagram, up shifts and down shifts can take place sequentially between the seven forward gears G1 to G7 without any interruption in traction.

Figures 3, 4:
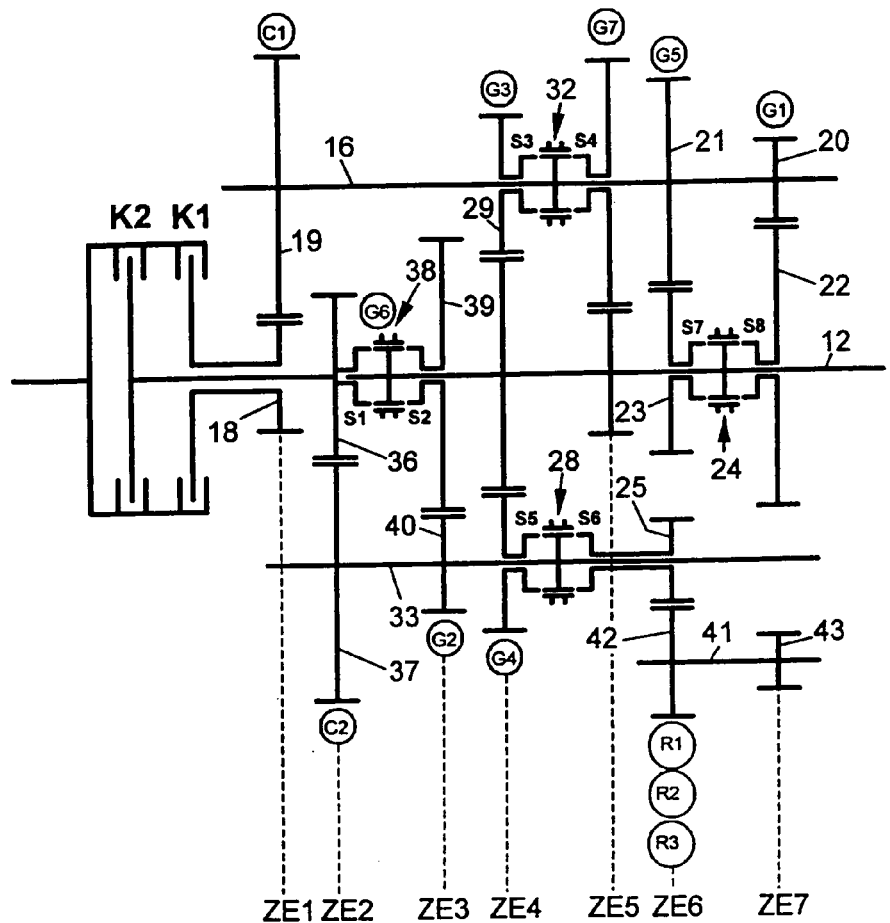
FIG. 3 shows diagrammatically a transmission diagram of a twin clutch transmission in a second embodiment of the invention.
FIG. 4 shows a table of the shift states of the clutches and shift sleeves of the twin clutch transmission according to FIG. 3.

FIG. 3 shows diagrammatically a transmission diagram of a twin clutch transmission in a second embodiment. Only the differences from the first embodiment are described below, since these relate merely to the reverse gears R1, R2 and R3.

In the first reverse gear R1, the torque path runs solely via a lower countershaft 33, whereas, in the second and the third reverse gear R2 and R3, the torque path runs via both countershafts 16, 33.

For this purpose, instead of the intermediate wheel according to the first embodiment which is assigned to the reverse gear, a reversing shaft 41 is provided, which lies offset in parallel to the transmission output shaft 12 and to the two countershafts 16, 33. This reversing shaft 41 carries two gearwheels 42, 43 spaced apart axially. The front larger gearwheel 42 meshes in the sixth gearwheel plane ZE6, on the one hand, with the loose wheel 25 and, on the other hand, with the loose wheel 23. The rear smaller gearwheel 43 meshes only with the loose wheel 22 lying in the seventh gearwheel plane ZE7.

The first reverse gear R1, in its torque path, runs basically in a similar way to the torque path of the second reverse gear R2 of the first embodiment according to FIG. 1 and FIG. 2. That is to say, in the first reverse gear R1, the second clutch K2 is engaged and the first clutch K1 is disengaged. The shift sleeve 24 is located in the rear position S8. The shift sleeve 28 is located in the rear position S6. The other two shift sleeves are located in a neutral position N. The torque path consequently runs via the clutch K2,
the second gearwheel plane ZE2 of the second transmission constant C2 having a driving gearwheel 36 and the driven gearwheel 37,
the shift sleeve 28,
the loose wheel 25,
the gearwheel 42,
the gearwheel 43 and
the loose wheel 22 to the transmission output shaft 12.

In the second reverse gear R2, the first clutch K1 is engaged and the second clutch K2 is disengaged. The shift sleeve 38 is located in the rear position S2. The shift sleeve 28 is located in the rear position S6. The other two shift sleeves are located in a neutral position N. The torque path consequently runs via the first clutch K1 and
the first gearwheel plane ZE1 of the first transmission constant C1 having the driving gearwheel 18 and the driven gearwheel 19 to the countershaft 16.

The torque path runs via the fixed wheel 20 to the loose wheel 22 and the rear gearwheel 43 of the reversing shaft 41.

The torque path runs from the gearwheel 42 via
the loose wheel 25,
the shift sleeve 28,
the countershaft 33,
the fixed wheel 40,
the loose wheel 39 and
the shift sleeve 38 to the transmission output shaft 12.

In the third reverse gear R3, the second clutch K2 is engaged and the first clutch K1 is disengaged. The shift sleeve 32 is located in the front position S3. The shift sleeve 28 is located in the rear position S6. The other two shift sleeves are located in a neutral position N. The torque path consequently runs via the second clutch K2 and
the second gearwheel plane ZE2 of the second transmission constant C2 having the driving gearwheel 36 and the driven gearwheel 37 to the countershaft 33. The torque path subsequently runs via the shift sleeve 28 in the position S6 to the loose wheel 25 and to the gearwheel 42 meshing with the latter. The torque path runs from here via the reversing shaft 41,
the smaller gearwheel 43,
the loose wheel 22,
the fixed wheel 20, the upper countershaft 16,
the shift element 32,
the loose wheel 29,
the fixed wheel 27
to the transmission output shaft 12.

Figures 5, 6:
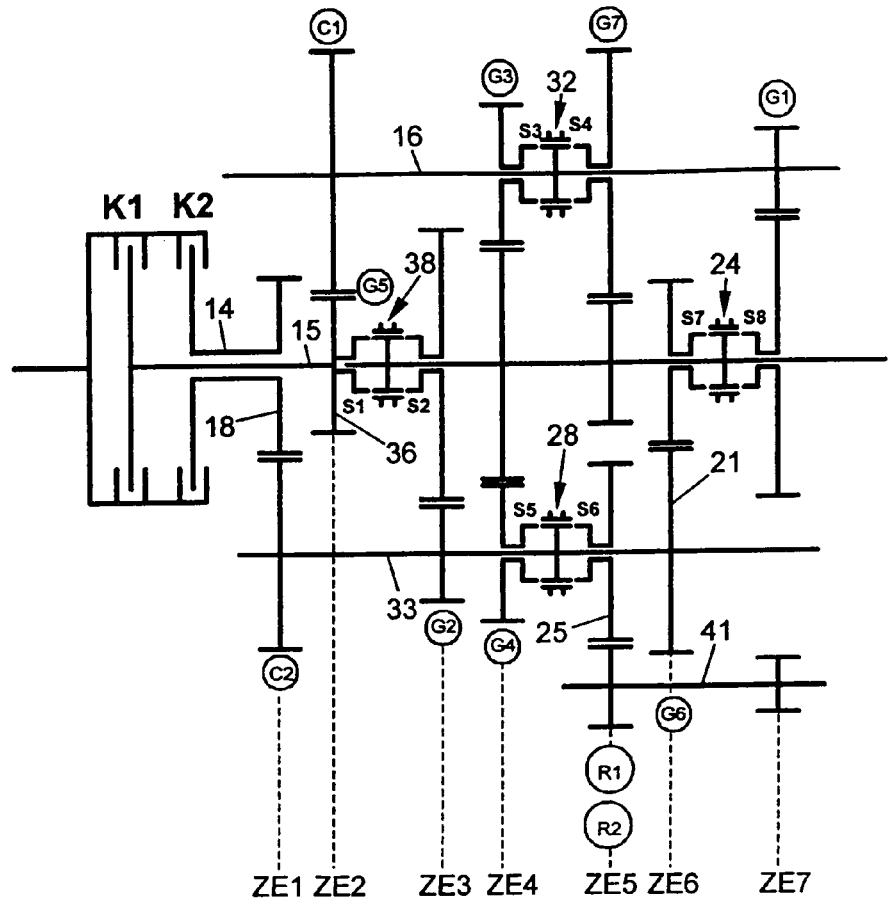
FIG. 5 shows diagrammatically a transmission diagram of a twin clutch transmission in a third embodiment of the invention.
FIG. 6 shows a table of the shift states of the clutches and shift sleeves of the twin clutch transmission according to FIG. 5.

FIG. 5 shows diagrammatically a transmission diagram of a twin clutch transmission in a third embodiment. Only the differences from the second embodiment according to FIG. 3 are described below.

These differences relate, on the one hand, to the two interchanged clutches K1 and K2, so that, in this case, the clutch K1 is connected to the radially inner intermediate shaft 15, its driving gearwheel 36 being smaller than the driving gearwheel 18 of the intermediate shaft 14 which is connected to the second clutch K2. The small driving gearwheel 36 belongs in this case to the first transmission constant C1, whereas the large driving gearwheel 18 belongs to the second transmission constant C2.

A further differentiating feature with regard to the second and the first embodiment according to FIG. 3 and FIG. 1 is that a fixed wheel 21 arranged on a countershaft in the sixth gearwheel plane ZE6 is not arranged on the upper countershaft 16, but, instead, on the lower countershaft 33. Consequently, however, the fixed wheel 21 of the sixth gearwheel plane ZE6 is arranged, in a similar way to the first and the second embodiment, on the countershaft which meshes directly with the intermediate shaft 14 designed as a hollow shaft. The fixed wheel 21 of the sixth gearwheel plane ZE6 is not assigned to the fifth forward gear G5, however, but to the sixth forward gear G6. Thus, in this third embodiment, the fifth forward gear G5 is the direct gear. Since the reversing shaft 41 likewise meshes with a loose wheel 25 of the lower countershaft 33 according to the other two embodiments, the displacement of the fixed wheel 21 onto the lower countershaft entails a reversing shaft 41 which is longer than that of the first two embodiments.

According to the third embodiment, 2 reverse gears R1 and R2 are provided.

FIG. 6 shows a table of the shift states of the clutches K1, K2 and shift elements 38, 32, 28, 24 of the twin clutch transmission 10 according to FIG. 5.

In the first forward gear G1, the torque path runs via the engaged first clutch K1. The second clutch K2 is disengaged. The shift sleeve 24 is located in the rear position S8. All the other shift sleeves are located in a neutral position N.

In the second forward gear G2, the torque path runs via the engaged second clutch K2. The first clutch K1 is disengaged. The shift sleeve 38 is located in the rear position S2. All the other shift sleeves are located in a neutral position N.

In the third forward gear G3, the torque path runs via the engaged first clutch K1. The second clutch K2 is disengaged. The shift sleeve 32 is located in the front position S3. All the other shift sleeves are located in a neutral position N.

In the fourth forward gear G4, the torque path runs via the engaged second clutch K2. The first clutch K1 is disengaged. The shift sleeve 28 is located in the front position S5. All the other shift sleeves are located in a neutral position N.

In the fifth forward gear G5, the torque path runs via the engaged first clutch K1. The second clutch K2 is disengaged. The shift sleeve 38 is located in the front position S1. The intermediate shaft 15 or the input shaft 11 is consequently connected fixedly in terms of rotation to the transmission output shaft 12 via the direct gear. All the other shift sleeves are located in a neutral position N.

In the sixth forward gear G6, the torque path runs via the engaged second clutch K2. The first clutch K1 is disengaged. The shift sleeve 24 is located in the front position S7. All the other shift sleeves are located in a neutral position N.

In the seventh forward gear G7, the torque path runs via the engaged first clutch K1. The second clutch K2 is disengaged. The shift sleeve 32 is located in the rear position S4. All the other shift sleeves are located in a neutral position N.

In the first reverse gear R1, the torque path runs via the engaged first clutch K1. The second clutch K2 is disengaged. The shift sleeve 24 is located in the rear position S8. The shift sleeve 28 is located in the rear position S6. The other two shift sleeves are located in a neutral position N.

In the second reverse gear R2, the torque path runs via the engaged second clutch K2. The first clutch K1 is disengaged. The shift sleeve 32 is located in the front position S3. The shift sleeve 28 is located in the rear position S6. The other two shift sleeves are located in a neutral position N.

Thus, in this transmission diagram, shifts can take place sequentially between the forward gears without any interruption in traction. The second reverse gear R2 may be assigned, in particular, to a winter driving program, so that, if there is poor ground adhesion, there is a shift to a lower reversing drive torque in the second reverse gear R2 without any interruption in traction. Furthermore, the second reverse gear R2 may be used in order to achieve higher reversing speeds than in the first reverse gear R1.

To implement the reverse gears, it is necessary, in a transmission according to FIG. 1, that a power flow can take place from the fixed wheel 21 to the loose wheel 25, or vice versa. For this purpose, these two gearwheels 21, 25 may mesh directly with one another, which presupposes that the respective shafts 16, 12, 33 are positioned with respect to one another in the triangular arrangement already explained above. Furthermore, it is possible to connect said gearwheels 21 and 25 via the loose wheel 23 and an intermediate gearwheel, not illustrated here. In this case, it is possible to position the shafts 11, 12, 16 and 33 both in one plane and in said triangular arrangement.

The number s of the (minimum) required shift units for a compact configuration according to the invention is calculated from a number n of forward gears according to the following principle:

if n is an odd number, then $$s=(n+1)/2,$$

if n is an even number, then $$s=(n+2)/2.$$

The shaft axes illustrated may be arranged in one plane or else in a three-dimensional arrangement, in particular in a triangular arrangement.

The shift sleeve may be designed in all the embodiments both as a synchronizing device and as a dog clutch.

The twin clutch transmission may alternatively also be designed with a single reverse gear.

The shift sleeves may be designed for shifting both via shift forks and shift rockers or else also directly by means of a coaxial shift actuator assembly, as is known, for example, from DE 101 03 664 A1.

Said shift actuator assembly for shift forks or shift rockers may be designed as a shift roller with grooves, as is known from motorcycles, or may be designed with an x-y actuator which introduces a rotational and translational movement into a shift shaft, a shift finger or one of a plurality of parallel shift rails.

The embodiments described are merely exemplary embodiments. A combination of the features described for different embodiments is likewise possible. Further features, in particular not described, of the device parts belonging to the invention may be gathered from the geometries, illustrated in the drawings, of the device parts.

The invention claimed is:
1. A twin clutch transmission (10) comprising:
   a transmission input shaft (11) and a transmission output shaft (12) that are arranged coaxially with respect to one another;
   two countershafts (16, 33), further comprising a first countershaft (33) and a second countershaft (16), said two countershafts being arranged offset in parallel with respect to one another, and to the transmission input shaft (11) and to the transmission output shaft (12);
   a direct gear;
   a plurality of forward gears, wherein
      even-numbered forward gears of said plurality of forward gears are assigned to the first countershaft (33);
      odd-numbered forward gears of said plurality of forward gears are assigned to the second countershaft (16); and
      the transmission input shaft is coupled to the second countershaft via two gearwheels in a first gearwheel stage, the second countershaft is coupled to the transmission output shaft via two gearwheels in a second gearwheel stage, and each of said plurality of forward gears taking place via at least two gearwheel stages;
   a plurality of shift sleeves, comprising a first shift sleeve (24), a second shift sleeve (38), a third shift sleeve (32), and a fourth shift sleeve (28), wherein
      said first shift sleeve is assigned to two forward gears, is arranged coaxially on the transmission output shaft (12), and is offset axially with respect to said second shift sleeve (38) assigned to the direct gear and to a further forward gear;
      said third shift sleeve and fourth shift sleeve (32, 28) are arranged in a shift sleeve plane and are offset axially with respect to said first shift sleeve and said second shift sleeve; and
      each of said third shift sleeve and said fourth shift sleeve is assigned to one of said two countershafts.

2. The twin clutch transmission as claimed in claim 1, wherein a reversal of direction of rotation in a reversing mode is implemented by means of an additional intermediate wheel.

3. The twin clutch transmission as claimed in claim 1, wherein a reversal of direction of rotation in a reversing mode is implemented by means of an additional intermediate shaft (41).

4. The twin clutch transmission as claimed in claim 1, wherein a reversal of direction of rotation in a reversing mode is implemented solely by means of gearwheels which are arranged coaxially with respect to the input and the output shaft or to the two countershafts.

5. The twin clutch transmission as claimed in claim 1, wherein a number s of the shift sleeves mounted in the twin clutch transmission is calculated from the number n of forward gears, for an odd number n from:

$$s = \frac{n+1}{2},$$

and, for an even number n, from:

$$s = \frac{n+2}{2}.$$

6. The twin clutch transmissions as claimed in claim 1, wherein the two countershafts (16, 33) and the input shaft (11) dispose at least approximately in one plane.

7. The twin clutch transmission as claimed in claim 1, wherein the two countershafts (16, 33) and the input shaft (11) are arranged in triangular form.

8. The twin clutch transmission as claimed in claim 1, wherein at least one gearwheel positions in different gear stages in the torque path.

9. The twin clutch transmission as claimed in claim 1, wherein the twin clutch transmission (10) is installed in a motor vehicle having an engine arranged longitudinally in the direction of travel and has
   n sequentially power-shiftable forward gears,
   two intermediate shafts (14, 15) which are arranged coaxially with respect to one another and one of which is designed as a hollow shaft (14) and
   two friction clutches (K1, K2) arranged concentrically with respect to the intermediate shafts (14, 15),
all the forward gears being actuated in each case by the selection of a single shift sleeve assigned to the respective forward gear, and one of these forward gears being designed as the direct gear.

10. The twin clutch transmission as claimed in claim 9, wherein the direct gear is designed as forward gear n, n−1 or −2.

11. The twin clutch transmission as claimed in claim 1, wherein a first forward gear (Gl) and a reverse gear (R1) are arranged in such a way that, for alternately shifting back and forth between the first forward gear and this reverse gear ("rocking cycle"), only an alternate actuation of input-side clutches (K1 and K2), without the actuation of the shift sleeve, is required.

12. The twin clutch transmission as claimed in claim 11, wherein this said reverse gear for alternately shifting back and forth with the first forward gear is a first reverse gear (R1).

* * * * *